United States Patent Office 3,032,481
Patented May 1, 1962

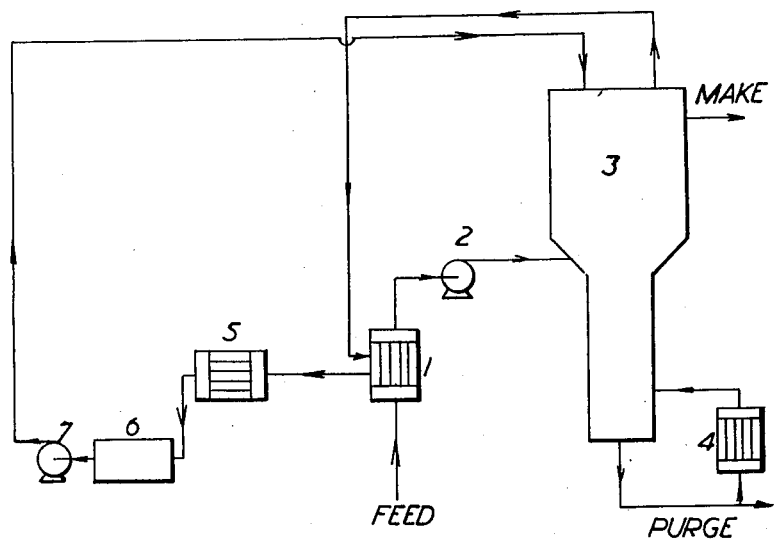

3,032,481
FRACTIONAL DISTILLATION
Anthony John Harding and Richard John Young, Norton-on-Tees, England, assignors to Imperial Chemical Industries Limited, London, England, a corporation of Great Britain
Filed Apr. 5, 1960, Ser. No. 20,151
Claims priority, application Great Britain May 1, 1959
12 Claims. (Cl. 202—61)

This invention relates to fractional distillation.

The components of a mixture of liquids are often separated by a continuous process of fractional distillation in a simple still which has a boiler provided with a direct supply of heat. The vapor evolved from the distillation column of the still contains a considerable amount of heat, which must be removed in order to effect condensation of this vapor. If this heat can be returned to the still and used therein in the process of separation of the components of the liquid mixture, the total energy consumption of the distillation process can be reduced.

It has already been proposed to heat the boiler of a still by means of the latent heat of condensation of the vapor evolved from the distillation column of the same still, after the temperature of this vapor, and also its condensation temperature, have been raised by thermo-compression to a level which is higher than the temperature of the liquid in the boiler. It has also been proposed to use thermo-compressed overhead vapor to vaporize feed liquid, which may then be directly introduced to the distillation column as a vapor instead of as a liquid. It will be appreciated that a continuous supply of feed liquid can be vaporized at a temperature which is less than the boiling point of its least volatile constituent; and therefore in this last mentioned distillation system the overhead vapor need not be compressed to such an extent that it be capable of heating the liquid in the boiler: with an efficient heat exchange system in the vaporizer, the temperature of the heating vapor, and its condensation temperature, need be only slightly higher than the steady boiling temperature of feed liquid in the vaporizer, this latter temperature being lower than that of the boiler.

Which of the three distillation systems described above (i.e. simple still, still with boiler heated by thermo-compressed overhead vapor, and still, in which thermo-compressed overhead vapor is used to pre-vaporize feed which is then introduced directly to the column as a vapor) is the best to use in practice depends on several factors. It may be shown theoretically that when separating the components of a binary mixture the system in which thermo-compressed overhead vapor is used to pre-vaporize feed, which is then introduced directly to the column as a vapor, is likely to be the most economical, so far as total energy consumption is concerned, in the case where the relative volatility of the components in the feed liquid is high, except when the feed contains only a small amount of the more volatile component. Clearly a thermo-compression system involves a greater capital outlay than is required for a simple still; but the additional initial cost of plant using thermo-compression may well be justifiable if a large scale distillation process is being contemplated.

We have devised a fractional distillation process which has a total energy consumption approximately equal to, or even less than, that of a system in which thermo-compressed overhead vapor is used to pre-vaporize feed which is then introduced directly to the column as a vapor. Our process also has certain advantages which are mentioned later in this specification.

According to the present invention we provide a process of fractional distillation in which vapor removed from a distillation column is used completely or partially to vaporize liquid feed by indirect heat exchange in a vaporizer, and the vaporized feed produced thereby is compressed and then introduced as a vapor into the said column at an intermediate point thereof, the said column being operated at a pressure higher than that in the vaporizer.

According to a preferred form of the invention we provide a process of fractional distillation in which vapor removed from a distillation column is used completely or partially to vaporize liquid feed by indirect heat exchange in a vaporizer, and the vaporized feed produced thereby is compressed and then introduced as a vapor into the said column at an intermediate point thereof, the pressure in the said column being maintained at such a level that the temperature, and condensation temperature, of the removed vapor are high enough to effect at least partial vaporization of the liquid feed without the said vapor being thermo-compressed.

Compression of the vaporized feed is preferably effected under substantially adiabatic conditions, in order to conserve the heat of compression. In any case the temperature of the vapor introduced into the distillation column should not be less than its condensation temperature, in order to avoid condensation of the vapor in the compressor.

The vaporizer may conveniently be operated at atmospheric pressure and the distillation column at super-atmospheric pressure.

The vapor removed from the distillation column is preferably overhead vapor from the top of the column.

It is preferred that the vapor used to heat the vaporizer be substantially completely condensed, and part of the liquid produced thereby returned to the column and used as reflux. The part of the said liquid which is not used as reflux constitutes the refined make. This may be taken off before the liquid to be used as reflux is returned to the column; or alternatively the whole of the condensed vapor may be returned to the column, and the refined make taken off from the top thereof.

Owing to the fact that heat must be supplied to the boiler of the column, overhead vapor from the column contains more latent heat than is required to vaporize feed; and the excess heat may be used in some convenient manner, such as for example to heat the boiler of a separate distillation column.

Although the process of the invention may be operated in such a way that the liquid feed is entirely vaporized, it may alternatively be arranged that part of the feed from it be separately fed as liquid into the distillation column.

The latter arrangement is particularly convenient in the case when the thermal level of the vapor removed from the column is not high enough to achieve complete vaporization of the liquid feed. In these circumstances a quantity of liquid accumulates in the vaporizer, and must be removed therefrom and introduced into the distillation column as a liquid. Moreover, if the liquid feed happens to contain dissolved solids, it is advantageous to remove part of the liquid from the vaporizer in order to prevent accumulation of solid material therein.

Whereas the invention is applicable to fractional distillation in general, our process is particularly applicable to separating two components of a liquid mixture when the two components have a high relative volatility and the mixture contains a fair amount of the more volatile component, because in these circumstances our process is particularly advantageous so far as energy consumption is concerned. The invention is especially convenient, for example, for rectification of crude methanol.

The process according to the invention is normally carried out in such a way that the rate of evolution of vapor from the top of the column is considerably greater than the rate of feed of vapor to the column. Hence if the system of thermo-compression of all the overhead vapor were used, more vapor would have to be compressed than in the preferred process of the present invention in which only vaporized feed is compressed. This would means that a larger, and therefore more expensive, pump would be needed, and also the cost of running the pump would be greater. Thus raising the pressure of distillation is the most economical way of raising the pressure of the overhead vapor. Alternatively, the overhead vapor could be split into two streams, so that only the requisite amount of vapor for use in the heat exchangers need be thermo-compressed. Clearly, however, the latter arrangement would make the distillation plant more complicated and less easy to control.

Another advantage of our invention is that the heat of compression of the vaporized feed is not wasted, inasmuch as it results in useful work of separation of the liquid components of the mixture in the distillation column. When overheated vapor is thermo-compressed to provide a source of heat for vaporizing the feed at least some of the heat of compression of the vapor is wasted.

A further advantage of our process over that in which only overhead vapor is thermo-compressed is as follows. Methanol has a smaller molar heat of evaporation than water has. Thus the volume of methanol which contains an amount of latent heat equal to that required to vaporize a feed comprising a mixture of methanol and water is greater than the volume of the vapor produced by the vaporization. It follows that the system of thermo-compression of overhead vapor requires compression of a larger volume of vapor than our preferred process does. This advantage applies in other cases in which the molar heat of vaporization of the more volatile constituent of the feed is less than that of the less volatile.

A specific embodiment of the invention will now be described with reference to the accompanying drawing. This is a diagrammatic drawing of the methanol distillation plant.

Crude methanol, consisting substantially of a mixture of methanol and water, is fed continuously to the vaporizer 1 in which it is completely vaporized. The vapor produced is compressed by pump 2, under substantially adiabatic conditions, to a pressure of about 2 atmospheres absolute, and fed into distillation column 3 at an intermediate point thereof. This serves to raise the pressure of distillation.

Heat is supplied to column 3 by means of reboiler 4, which is heated by steam. Substantially pure methanol is removed from the top of column 3 and heavy ends are purged from the bottom of the column.

Overhead vapor from column 3 is passed through the vaporizer 1, in indirect heat exchange with the methanol feed. Some of the vapor condenses in supplying heat to vaporize the feed, and the remainder of the vapor passes to an air-cooled condenser 5 in which it is condensed. Liquid produced by condensation of vapor in evaporator 1 also passes to condenser 5, and liquid from this condenser is passed to a drum 6 from which it is pumped by pump 7 to the top of column 3 as reflux.

With pressures of approximately 1 and 2 atmospheres absolute respectively in vaporizer 1 and column 3, the temperature in the reboiler 4 is about 120° C., the temperature of the overhead vapor from column 3 is about 84° C., which is approximately the condensation temperature of the vapor at 2 atmospheres absolute pressure, and the temperature of the vaporized feed leaving the vaporizer is about 69° C.

We claim:
1. A process of fractional distillation which comprises at least partially vaporizing liquid feed, compressing the vaporized feed, introducing the compressed vapor into the intermediate point of a distillation column, introducing any unvaporized feed into an intermediate point of said column, removing vapors from said column, said liquid feed being partially vaporized by passing in heat exchange relationship with vapors removed from said column, and maintaining pressure in said column higher than the pressure at which said liquid feed is vaporized.

2. A process according to claim 1 in which the pressure in the column is maintained at such a level that the temperature, and condensation temperature, of the removed vapor are high enough to effect at least partial vaporization of the liquid feed.

3. A process according to claim 1 in which compression of the vaporized feed is effected under substantially adiabatic conditions.

4. A process according to claim 1 in which liquid feed is vaporized at atmospheric pressure and the distillation column at super-atmospheric pressure.

5. A process according to claim 1 in which the vapor removed from the distillation column is overhead vapor from the top of the column.

6. A process according to claim 1 in which the vapor used to vaporize said liquid feed is substantially completely condensed, and part of the liquid produced thereby returned to the column and used as reflux.

7. A process according to claim 1 in which excess latent heat of the removed vapor over that required to vaporize the feed is used to heat the boiler of a separate distillation column.

8. A process according to claim 1 in which the mixture being distilled comprises two components having a higher relative volatility and the mixture contains a substantial amount of the more volatile component.

9. A process according to claim 1 in which the liquid mixture is crude methanol.

10. A process of fractional distillation which comprises at least partially vaporizing liquid feed at substantially atmospheric pressure, substantially adiabatically compressing the vaporized feed, introducing vapor into the intermediate point of a distillation column, introducing any unvaporized feed into an intermediate point of said column, removing vapors from said column, said liquid feed being vaporized by passing in heat exchange relationship with vapors removed from said column while substantially completely condensing the vapors passed in heat exchange relationship with said liquid feed, and maintaining pressure in said column sufficiently high that the temperature, and condensation temperature, of the overhead vapor are high enough to effect at least partial vaporization of the liquid feed without the said vapor being thermo-compressed.

11. A process according to claim 10 in which excess latent heat of the overhead vapor over that required to vaporize feed is used to heat the boiler of a separate distillation column.

12. A process according to claim 10 in which the liquid mixture being distilled is crude methanol.

References Cited in the file of this patent

UNITED STATES PATENTS

| | | |
|---|---|---|
| 2,327,643 | Houghland | Aug. 24, 1943 |
| 2,520,186 | Von Platen | Aug. 29, 1950 |
| 2,805,984 | St. Clair | Sept. 10, 1957 |
| 2,912,365 | Irvine | Nov. 10, 1959 |